UNITED STATES PATENT OFFICE.

JAMES MACLAGAN, OF NEW YORK, N. Y., ASSIGNOR OF ONE-HALF TO CHARLES F. McMANNUS, OF NEW YORK, N. Y.

RECORD-CARD.

No. 912,969.     Specification of Letters Patent.     Patented Feb. 16, 1909.

Application filed January 16, 1907. Serial No. 352,494.

*To all whom it may concern:*

Be it known that I, JAMES MACLAGAN, a citizen of the United States, and a resident of New York, in the county of New York and State of New York, have invented certain new and useful Improvements in Record-Cards, of which the following is a specification.

My invention relates to record cards, particularly to fire insurance record cards.

It has for its object to provide a card of this character having spaces on its front and rear faces for receiving information relative to an insurance transaction, headings printed or otherwise placed over said spaces to indicate the required information and the spaces in which it is to be placed and a pocket for containing the contract forms relative to the transaction, thereby providing a card adapted to contain a complete and independent record of each insurance transaction in such form that it may be easily and readily referred to.

It has for a further object to provide a card of this character embodying advantages in point of simplicity and inexpensiveness of construction and durability.

In the drawings: Figure 1 is a front face view of my card showing the pocket and a contract paper therein. Fig. 2 a rear face view, and Fig. 3 an edge view.

Like reference characters designate corresponding parts in all the figures of the drawings illustrating my invention.

Referring to the drawings, 1 designates the record card which may be of any suitable material, size or shape, and having on its front face 2, a pocket 3, open at each end, and adapted to contain a contract form 4 relative to an insurance transaction, the pocket being formed of a strip 5 of any desired material, having its upper and lower edges 6 turned over and pasted or otherwise secured to the front face of the card, and provided with a hole 7 extending through it to afford means for easily sliding the contract form out of the pocket by bringing one of the fingers into contact therewith.

The front and rear faces of the card are divided by longitudinal and transverse lines, printed or otherwise placed thereon, into spaces in which to record the required information relative to an insurance transaction and over each of these tables headings are printed or otherwise placed to indicate the required information and the spaces in which it is to be placed.

The front face of the card is adapted to have placed thereon by the agent or employee of the company, under the proper headings, information relative to the original application, the expiration thereof and the renewal thereof, if renewed, and the rear face is adapted to have placed thereon information relative to the nature and location of the property insured and the insurance, by the original insuring company, of part of its risk in another insurance company, if it desires to make a division thereof.

It will be understood that this card is made out in applying for insurance, by the agent and sent to the office of the company, the contract is then placed in the pocket and the card filed away, thereby obviating the necessity for the clerks in the office of the company, making it out and instead of having the cards and contract filed away separately, the complete record of each transaction is filed away in one package, which can be easily and quickly handled and referred to.

I do not wish to be understood as limiting myself to the precise details and arrangements of parts shown and described, but reserve the right to all modifications within the scope of my invention.

Having now described my invention, what I claim as new and desire to secure by Letters Patent, is—

A record device having a pocket and constructed of two parts, one part consisting of a resilient card forming one wall of said pocket, and the other part consisting of a resilient strip of less width but of the same length as the said card forming the other wall of said pocket and having a finger hole, the side edges of said strip being turned under and permanently secured to said card from end to end and the end edges being free and in alinement with the ends of said card, substantially as described.

Signed at New York, in the county of New York, and State of New York, this 4th day of January A. D. 1907.

JAMES MACLAGAN.

Witnesses:
     A. B. BLACKWOOD,
     A. R. APPLEMAN.